Patented Oct. 17, 1922.

1,432,102

UNITED STATES PATENT OFFICE.

FREDERICK L. EMMERT, OF CINCINNATI, OHIO.

PROCESS OF PREPARING LIQUID SOAP.

No Drawing. Application filed April 15, 1921. Serial No. 461,640.

*To all whom it may concern:*

Be it known that I, FREDERICK L. EMMERT, a citizen of the United States, and a resident of Cincinnati, in the county of Hamilton and State of Ohio, have invented a certain new and useful Process of Preparing Liquid Soap, of which the following is a full, clear, and exact description.

My invention relates to liquid soap processes, and more particularly to the preparation of liquid soap from what is known as surgical green soap.

Those soaps known as pure, surgical green soaps are of a soft soap variety made from oils and caustic potash. The usual method of preparing a liquid soap from such materials is to form a tincture thereof in alchohol.

The difficulty with forming an aqueous solution of surgical soft soap, which would in many cases be superior to the tincture, is that when in such solution the soaps have always in the past developed a cloudiness when cold. The cloudiness, whatever be its nature, is an insoluble material, resulting from saponification of the oils and renders the soap undesirable.

It is the object of my invention to produce a water solution of pure soft soap, which will not be cloudy and which will have a good body and lathering and cleansing qualities.

I accomplish my object by that certain process to be hereinafter more specifically pointed out and claimed.

The soap which I employ may be purchased in commerce or produced at first hand if desired, and consists preferably in soap made by the United States Pharmaceutical Formula, out of pure oils and potassium hydroxide. I do not desire to limit myself to this particular soap, however, or to the use of the special potassium base, above noted.

According to a formula worked out by me, in small quantity production I take three pounds of United States pharmaceutical surgical green soap (so called sapo viridis) and add one gallon of hot water below the boiling point. I pour the materials into a suitable container and stir occasionally until the soap is dissolved as far as possible.

According to one form of my process I permit this liquor to cool and add when cold about one half an ounce of aqua ammonia (10%) and permit the liquor to stand for twelve or fifteen hours, stirring occasionally. Also after the ammonia has been thoroughly incorporated I add such perfume as desired in a preferred instance one half ounce of oil of citronella and stir occasionally, permitting the materials to stand for as much as twenty-four or thirty hours, so that the oil is thoroughly incorporated into the soap.

I then proceed to filter the soap using a container made of tripoli and well known as a tripoli filter. At this point I wish to note that the most important feature of my invention is evidenced, the addition of the ingredients above being preferential, so far as I have been able to determine. It is in this filter that the cloudiness, hitherto apparent in water dissolved soaps, is removed.

I have found that a filter bed may be formed in a filter of porous rock nature, such as a tripoli filter, this bed being the more easily deposited impurities or cloudiness-forming bodies of the soap. The result of passing the dissolved body through such a filter by gravity for about an hour is to form a somewhat granular, waxy coating in the filter, and to fill the pores with this material.

After this has been done, the filter is ready for use, and a proper filter bed may be preserved in cleaning the filters after use. The liquid passing through the filter and the filter bed formed therein will come perfectly clear and bright. The filter must not be disturbed so as to destroy the filter bed, and thus I have not attempted to force the liquor through the filter, although I am not desirous of limiting myself to a mere gravity feed.

Coming back to the exact formula above noted, I bring the clarified solution to a suitable heat and add two and one-half ounces of potassium carbonate (U. S. P.) same being in powder form, stirring and maintaining the heat until the carbonate has been entirely dissolved, say for about fifteen minutes. Also before permitting the soap to cool I add napthol green B. coloring solution, to give a good green color, or such other coloring matter as is desired, and the product is ready for the market.

The residue in the filter, as has been stated, is an opaque, waxy, soap-like body making up the insoluble portions of the soft soap and the ammonia is added to increase the cleansing qualities. The potassium carbonate gives body and lathering qualities to the liquid, and appears to impart brilliancy and a honey or glycerine-like body to the soap.

The liquid soap so prepared is a very thorough cleanser and leaves the skin soft and pliable and when used as a shampoo results in beneficial action on the scalp and hair.

The coloring matter and perfume, are, of course purely matters of preference.

Having thus described my invention, what I claim as new and desire to secure by Letters Patent, is:—

1. The process of preparing liquid soap, which consists in dissolving soap in water and passing the liquid so formed through a porous stone filter formed of tripoli.

2. The process of preparing liquid soap, which consists in dissolving soft soap in water, passing the liquid so formed through a porous stone filter in a preliminary way to form a filter bed and then filtering the liquid for use.

3. The process of preparing liquid soap, which consists in dissolving soap in water, preparing a filter by coating thoroughly a porous rock filter with a filter bed of impurities of such dissolved soap, and then filtering the dissolved soap through such a filter.

4. The process of preparing liquid soap, which consists in dissolving soap in water, preparing a filter by coating a tripoli filter with a filter bed of the impurities of such dissolved soap, and then filtering the dissolved soap through such filter.

5. The process of preparing liquid soap, which consists in dissolving soap in water, preparing a filter by coating a porous rigid stone filter with a coating of closely granular, waxy material, and then filtering the dissolved soap through such filter.

6. The process of preparing liquid soap, which consists in dissolving soap in water, and passing the liquid so formed through a porous tripoli filter in a preliminary way to form a filter bed, and then filtering the liquid for use, and adding to the filtered solution the desired quantity of potassium carbonate.

7. The process of preparing liquid soap, which consists in dissolving soap in water, preparing a filter by coating a porous rigid tripoli filter with a coating of closely granular, waxy material, and then filtering the dissolved soap through such filter, said dissolved soap being treated with aqua ammonia, at any desired stage of the process.

8. The process of preparing liquid soap, which consists in taking water and soft soap in the proportions of one gallon of water to three pounds of soap and forming a solution, then adding aqua ammonia, and filtering the resulting solution through a porous tripoli rock filter coated with a filter bed of impurities of such solutions previously prepared, and finally adding potassium carbonate, and such perfume and coloring matter as desired.

9. The process of preparing liquid soap, which consists in making a solution of soft soap and water in the proportions of one gallon of water to three pounds of soap, filtering same through a porous tripoli rock filter coated with a filter bed of impurities of such solutions previously prepared, and finally adding potassium carbonate to the filtered body.

FREDERICK L. EMMERT.